March 17, 1936. M. J. SCHLITTERS 2,034,118
TOOL HOLDER
Original Filed Aug. 23, 1933 2 Sheets-Sheet 1
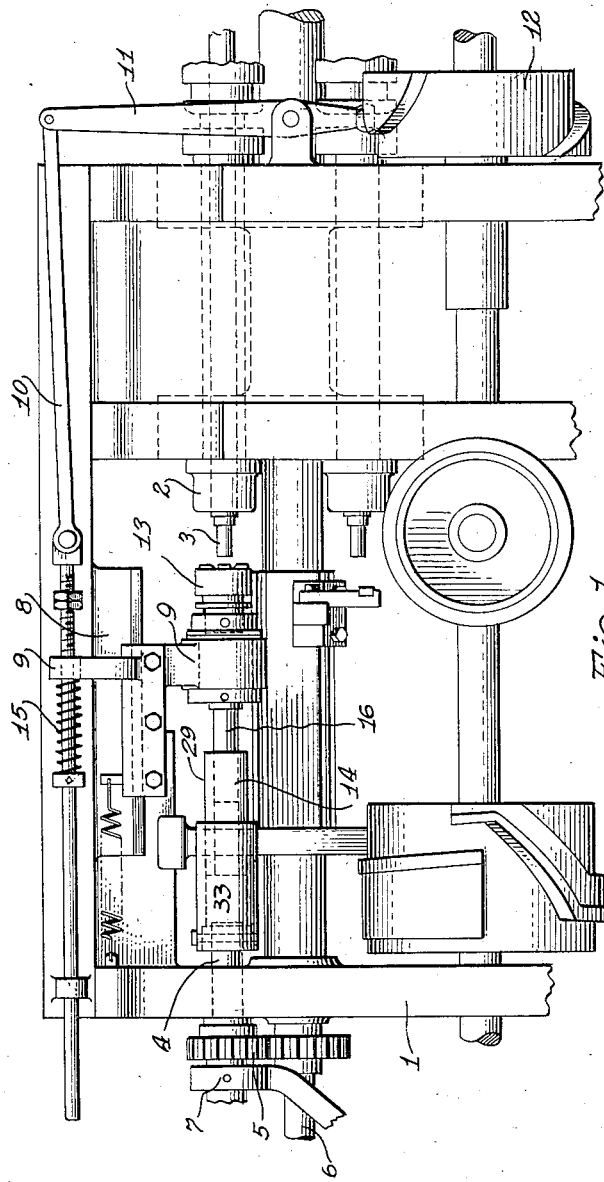
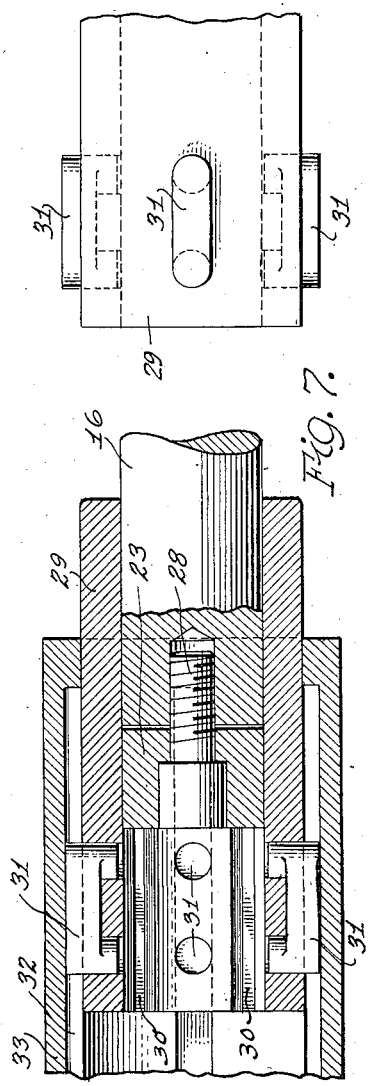
INVENTOR
Michael J. Schlitters,
BY Binns W Wadsworth
ATTORNEYS March 17, 1936.  M. J. SCHLITTERS  2,034,118
TOOL HOLDER
Original Filed Aug. 23, 1933  2 Sheets-Sheet 2
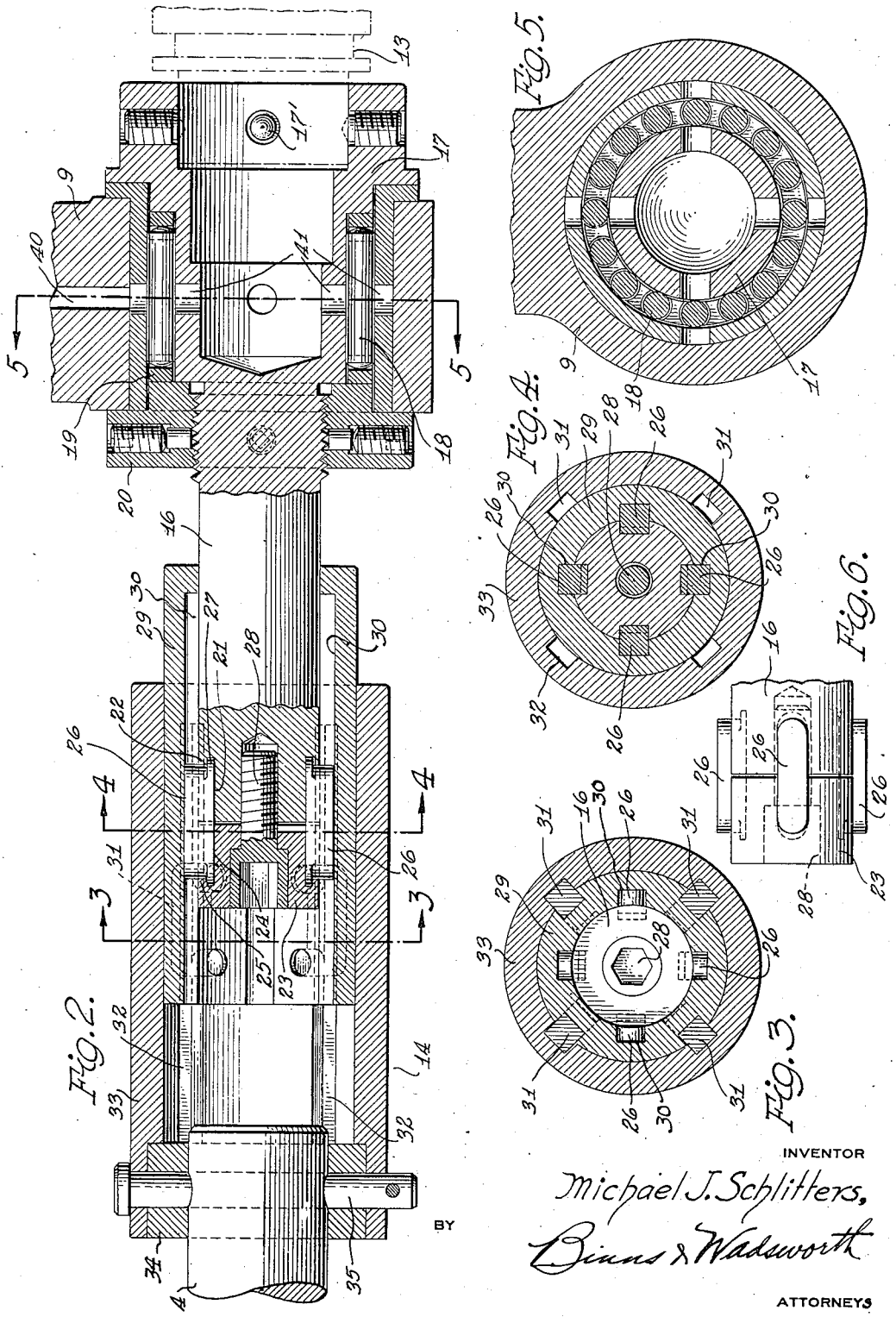

Patented Mar. 17, 1936

2,034,118

UNITED STATES PATENT OFFICE 2,034,118

TOOL HOLDER

Michael J. Schlitters, Detroit, Mich.

Application August 23, 1933, Serial No. 686,386
Renewed January 21, 1936

2 Claims. (Cl. 29—57)

This invention relates to a novel adjustable tool holder or adjustable spindle for turret lathes and screw machines of the type wherein a rotating tool is moved towards the work to perform screw threading, knurling, drilling, reaming or boring operations thereon.

The primary object of the present invention is to provide an adjustable tool holder or spindle for turret lathes and like machines and particularly such machines now on the market known as Gridley automatics, models F and G, the tool holder being adjustable telescopically to permit the machine to be used on work of lengths other than ordinarily considered standard. Ordinarily in such lathes or machines it is the practice to provide tool holders or spindles comprising a shaft equipped with a telescoping sleeve, said sleeves being of different lengths corresponding approximately to the lengths of the work to be handled, thereby making it necessary to change the tool support or spindle every time the machine is used for different length operations. In order to adapt the machine for work of a length other than that defined by the length of a particular tool holder, it was necessary to cut such tool holder in order that the required movement of the tool relative to the work may be attained. Therefore, by providing a plurality of short sleeves in a telescopically adjustable tool holder, the present invention avoids the necessity of cutting tool holders because of the fact that it is adjustable to any length, and further increases the adaptability or range of a machine once it has been set up, thus saving time and money and increasing production.

With the above and other ends in view the invention consists of the matters hereinafter set forth and more particularly pointed out in the appended claims, reference being had to the accompanying drawings, in which Fig. 1 is a fragmentary side elevation of a screw machine equipped with the present adjustable tool support;

Fig. 2 is a longitudinal section through the tool support;

Fig. 3 is a transverse section taken on the line 3—3 of Fig. 2;

Fig. 4 is a transverse cross section taken on the line 4—4 of Fig. 2;

Fig. 5 is a transverse cross section taken on the line 5—5 of Fig. 2;

Fig. 6 is a fragmentary detail;

Fig. 7 is a fragmentary longitudinal section of Fig. 2, and

Fig. 8 is a fragmentary detail.

Like characters are used throughout to designate corresponding parts.

The numeral 1 indicates the frame of a conventional screw machine having a chuck 2 in which work 3 is mounted. In the present instance it will be assumed that the work represented is a member of circular cross section that is to be screw-threaded. In the end of the frame, opposite to that supporting the chuck, is mounted a spindle shaft 4 geared as at 5 to a drive shaft 6 and having a sliding clutch 7 for controlling the operation thereof. Adjacent the upper part of the frame is mounted a tool guide 8 slidably receiving a tool support 9 that is connected by a link 10 to an operating lever 11 that is moved longitudinally by rotation of a cam 12. 13 indicates any conventional threading tool supported on the end of a telescopical shaft and tool holder 14, the outer end of which is carried in the slidable tool support 9.

When the shaft 6 is rotated and the clutch 7 engaged, the spindle 4 is rotated and through holder 14 the tool 13 is rotated. It will be understood that the cam 12 rotates in timed relation with the shaft 6 and therefore as the cam 12 rotates it rocks the lever 11 and pulls the link 10 to compress a spring 15 against the slidable tool support 9, causing the latter to move the tool 13 longitudinally until it engages the work 3.

The above descriptive matter might well represent any well known type of turret lathe or screw machine and it will be understood that the tool 13 might be a threading tool, a knurling tool, a drill, a reamer, or a boring tool. The particular invention relates to the telescopic shaft and tool holder or spindle designated generally at 14 and which comprises a shaft 16 having a hollow head 17 formed on its outer end suitable for receiving the tool 13, the latter being secured in place by set screws 17'. The head 17 is provided with roller bearings 18 in a race 19 which is secured in place by a nut 20. Adjacent the other end of the shaft 16 there is formed a plurality of grooves 21 having overhanging portions 22 and a retainer 23 is provided with corresponding grooves 24 and overhanging portions 25. Keys 26 are received in the grooves 21 and 24 and are formed with outwardly extending portions 27 that are received beneath the overhanging portions 22 and 25, the keys being secured in this relation by a screw 28 that passes through the retainer 23 into the shaft. Slidably mounted on the shaft 16 is a sleeve 29 having grooves 30 extending throughout a major portion of its length and into which the keys 26 project. The sleeve 29 is equipped with externally extending keys 31 that are received in grooves 32 that extend throughout a major portion of an outer sleeve 33. A ring 34 is secured in the outer end of the sleeve 33 by a bolt 35 that passes through the shaft 4 in a manner to secure the sleeve 33 to the shaft 4 to rotate therewith.

When the present tool holder is assembled in a machine, as above described, and a tool mounted in the hollow head 17 the adaptability of the machine to work of lengths other than standard is increased due to the fact that the sleeves 29 and 33 may be nested relative to each other and relative to the shaft 16 while they rotate as a unit. It is therefore unnecessary to provide spindles 4 with tool holders of different lengths in order to adapt the machine to different types of work, such as extra long work or extra short work.

A passage 40 is formed in the tool support 9 to supply lubricant to the bearings 18 and to the hollow head 17 through a port 41 which registers with passage 40.

Although a specific embodiment of the present invention has been illustrated and described it is to be understood that various changes may be made in the details of construction without departing from the spirit of the invention as set forth in the appended claims and such changes are contemplated.

I claim:

1. In a screw machine, a fixed rotatable spindle, a fixed work supporting chuck, a sleeve detachably mounted on said spindle and adapted to rotate therewith, a second sleeve keyed to rotate with said first named sleeve and adapted to slide therein, a shaft keyed to said second sleeve and slidable therein and a tool holder carried by said shaft, in alignment with said chuck.

2. In a screw machine, a fixed rotatable spindle, a fixed work supporting chuck, a sleeve detachably mounted on said spindle and adapted to rotate therewith, a second sleeve keyed to rotate with said first named sleeve and adapted to slide therein, a shaft keyed to said second sleeve and slidable therein, a tool holder carried by said shaft in alignment with said chuck, and means for moving said tool holder whereby said shaft and sleeve move telescopically.

MICHAEL J. SCHLITTERS.